US012643797B2

(12) United States Patent
Ha

(10) Patent No.: US 12,643,797 B2
(45) Date of Patent: Jun. 2, 2026

(54) CLASSIFIER FOR POSITIVE ELECTRODE ACTIVE MATERIAL AND METHOD FOR REGENERATING LITHIUM PRECURSOR BY USING SAME

(71) Applicant: SK INNOVATION CO., LTD., Seoul (KR)

(72) Inventor: Hyeon Bae Ha, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 723 days.

(21) Appl. No.: 17/911,872

(22) PCT Filed: Mar. 12, 2021

(86) PCT No.: PCT/KR2021/003073
§ 371 (c)(1),
(2) Date: Sep. 15, 2022

(87) PCT Pub. No.: WO2021/187808
PCT Pub. Date: Sep. 23, 2021

(65) Prior Publication Data
US 2023/0116551 A1      Apr. 13, 2023

(30) Foreign Application Priority Data
Mar. 19, 2020      (KR) ........................ 10-2020-0033965

(51) Int. Cl.
*C01D 15/02* (2006.01)
*B07B 4/08* (2006.01)
(Continued)

(52) U.S. Cl.
CPC ................ *C01D 15/02* (2013.01); *B07B 4/08* (2013.01); *C01D 15/08* (2013.01); *H01M 10/54* (2013.01); *Y02E 60/10* (2013.01); *Y02W 30/84* (2015.05)

(58) Field of Classification Search
None
See application file for complete search history.

(56) References Cited

U.S. PATENT DOCUMENTS 6,811,923 B1 * 11/2004 Sakai .................... H01M 10/54
429/231.1
8,882,007 B1 * 11/2014 Smith .................... H01M 10/54
241/23
(Continued)

FOREIGN PATENT DOCUMENTS

CN        102569940 A        7/2012
CN        102694217 A        9/2012
(Continued)

OTHER PUBLICATIONS

English translation of KR 2014-126943 (originally published Nov. 3, 2014), obtained from PE2E search.*
(Continued)

*Primary Examiner* — Melvin C. Mayes
(74) *Attorney, Agent, or Firm* — The PL Law Group, PLLC

(57)        ABSTRACT

In a method for regenerating a lithium precursor, a cathode active material mixture that includes an active material powder including lithium composite oxide particles and dust particles is prepared. The dust particles are separated from the cathode active material mixture using a classifier to collect the active material powder. The active material powder is reduced to form a preliminary precursor mixture. A lithium precursor is recovered from the preliminary precursor mixture. The lithium precursor can be obtained with high purity and high yield.

7 Claims, 2 Drawing Sheets

(51) Int. Cl.
    *C01D 15/08*      (2006.01)
    *H01M 10/54*    (2006.01)

(56)         References Cited

U.S. PATENT DOCUMENTS

| | | | |
|---|---|---|---|
| 2008/0050295 A1* | 2/2008 | Uchida | C22B 26/12 |
| | | | 423/179.5 |
| 2009/0229413 A1* | 9/2009 | Kakuta | C25C 7/005 |
| | | | 204/243.1 |
| 2021/0115532 A1* | 4/2021 | La | C01G 53/04 |
| 2022/0045374 A1* | 2/2022 | Pan | C01G 53/42 |
| 2022/0200075 A1* | 6/2022 | Lim | H01M 10/54 |
| 2023/0048057 A1* | 2/2023 | Hong | H01M 4/505 |
| 2023/0250507 A1* | 8/2023 | Lee | C01G 51/10 |
| | | | 75/743 |
| 2023/0416103 A1* | 12/2023 | Hong | C22B 23/0461 |

FOREIGN PATENT DOCUMENTS

| | | | |
|---|---|---|---|
| CN | 105013706 A | 11/2015 | |
| CN | 205609702 U | 9/2016 | |
| CN | 107790274 A | 3/2018 | |
| CN | 107790382 A | 3/2018 | |
| CN | 108365290 A | 8/2018 | |
| CN | 109821740 A | 5/2019 | |
| CN | 110828887 A | 2/2020 | |
| JP | 2003-117535 A | 4/2003 | |
| KR | 10-2006-0101683 A | 9/2006 | |
| KR | 10-2001-0106562 A | 1/2007 | |
| KR | 10-2012-0094622 A | 8/2012 | |
| KR | 10-2014-0126943 A | 11/2014 | |
| KR | 10-2015-0002963 A | 1/2015 | |
| KR | 10-2015-0094412 A | 8/2015 | |
| KR | 10-2018-0065471 A | 6/2018 | |
| KR | 10-1973483 B1 | 4/2019 | |
| KR | 10-2019-0044792 A | 5/2019 | |
| KR | 10-2020238 B1 | 9/2019 | |
| WO | WO 00/079621 A1 | 12/2000 | |

OTHER PUBLICATIONS

European Search Report for EP 21772069.7 issued on Mar. 22, 2024 from European patent office in a counterpart European patent application.

International Search Report for PCT/KR2021/003073 mailed on Jun. 18, 2021.

Office action issued on Nov. 5, 2024 from Japan Intellectual Property Office in a counterpart Japanese Patent Application No. 2022-556069 (all the cited references are listed in this IDS.) (English translation is also submitted herewith.).

Office action issued on Oct. 31, 2023 from China Patent Office in a counterpart China Patent Application No. 202180021962.3 (all the cited references are listed in this IDS.) (English translation is also submitted herewith.).

Office action issued on Jan. 12, 2026 from China Patent Office in a counterpart China Patent Application No. 202410752662.8 (all the cited references are listed in this IDS.) (English translation is also submitted herewith.).

* cited by examiner

CLASSIFIER FOR POSITIVE ELECTRODE ACTIVE MATERIAL AND METHOD FOR REGENERATING LITHIUM PRECURSOR BY USING SAME

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/003073, filed Mar. 12, 2021, which claims priority to the benefit of Korean Patent Application No. 10-2020-0033965 filed in the Korean Intellectual Property Office on Mar. 19, 2020, the entire contents of which are incorporated herein by reference.

BACKGROUND

1. Technical Field

The present invention relates to a classifier for a cathode active material and a method of regenerating lithium precursor using the same. More particularly, the present invention relates to a classifier for a cathode active material and a method of regenerating lithium precursor from a waste lithium-containing compound using the same

2. Background Art

A secondary battery which can be charged and discharged repeatedly has been widely employed as a power source of a mobile electronic device such as a camcorder, a mobile phone, a laptop computer, etc., according to developments of information and display technologies. The secondary battery includes, e.g., a lithium secondary battery, a nickel-cadmium battery, a nickel-hydrogen battery, etc. The lithium secondary battery has been actively developed and applied among the batteries due to high operational voltage and energy density per unit weight, a high charging rate, a compact dimension, etc.

The lithium secondary battery may include an electrode assembly including a cathode, an anode, a separation layer (separator), and an electrolyte immersing the electrode assembly. The lithium secondary battery may further include an outer case having, e.g., a pouch shape for housing the electrode assembly and the electrolyte.

A lithium metal oxide may be used as a cathode active material of the lithium secondary battery. The lithium metal oxide may additionally contain a transition metal such as nickel, cobalt, manganese, etc.

The lithium metal oxide as the cathode active material may be prepared by reacting a lithium precursor and a nickel-cobalt-manganese (NCM) precursor containing nickel, cobalt and manganese.

As the above-mentioned high-cost valuable metals are used for the cathode active material, 20% or more of a production cost is required for manufacturing the cathode material. Additionally, as environment protection issues have recently been highlighted, a recycling method of the cathode active material is being researched. For the recycling of the cathode active material, regeneration of the lithium precursor from a waste cathode is required with high efficiency and high purity.

For example, Korean Published Patent Application No. 2015-0002963 discloses a method for recovering lithium using a wet method. However, lithium is recovered by a wet extraction from a waste liquid remaining after extraction of cobalt, nickel, etc., and thus a recovery ratio is excessively reduced and a large amount of impurities may be generated from the waste liquid.

SUMMARY

According to an aspect of the present invention, there is provided a classifier for recovering a lithium precursor with high purity and high yield, and a method of regenerating a lithium precursor using the same.

In a method for regenerating a lithium precursor according to embodiments of the present invention, a cathode active material mixture that includes an active material powder including lithium composite oxide particles and dust particles is prepared. The dust particles are separated from the cathode active material mixture using a classifier to collect the active material powder. The active material powder is reduced to form a preliminary precursor mixture. A lithium precursor is recovered from the preliminary precursor mixture.

In exemplary embodiments, the dust particles may include particles derived from a carbon-based conductive material and a binder.

In exemplary embodiments, in collecting the active material powder, the active material powder may be classified into a first active material powder and a second active material powder to be each collected.

In exemplary embodiments, an average particle diameter of the second active material powder may be smaller than an average particle diameter of the first active material powder.

In exemplary embodiments, the collected first active material powder may be subjected to a reductive treatment to form the preliminary precursor mixture, and the collected second active material powder may be treated with an acid solution.

In exemplary embodiments, the separation of the dust particles and the classification of the first active material powder and the second active material powder may be performed together in the classifier.

In exemplary embodiments, the reduction of the active material powder may be performed in a fluidized bed reactor using a reductive reaction gas.

In exemplary embodiments, recovering the lithium precursor from the preliminary precursor mixture may include washing the preliminary precursor mixture with water.

In exemplary embodiments, a classifier for a cathode active material includes an active material inlet through which a cathode active material mixture that includes an active material powder including lithium composite oxide particles and dust particles is injected, a classifying body including a classifying sieve for classifying the active material powder into a first active material powder and a second active material powder, an upper outlet located at an upper portion of the classifying body so that dust particles are scattered and discharged from the cathode active material mixture, an active material outlet connected to a central portion of the classifying body to discharge the first active material powder, and a lower outlet connected to a lower portion of the classifying body to discharge the second active material powder of the cathode active material mixture.

In exemplary embodiments, a fluid inlet located at the lower portion of the classifying body so that a fluid is injected therethrough may be further included.

According to the above-described exemplary embodiments, dust particles may be separated from a cathode active material mixture using a classifier, and an active material powder including lithium composite oxide particles may be collected. In this case, the active material powder may have improved reductive process efficiency, and thus a lithium precursor of high yield and high purity may be more easily obtained.

In some embodiments, the dust particles may include particles derived from a carbon-based conductive material and a binder. In this case, carbon-based particles may be separated from the cathode active material mixture, so that the active material powder having a low concentration of the carbon-based particles may be collected. Accordingly, side reactions that may occur during the reductive process may be minimized, and a recovery ratio of the lithium precursor may be further improved.

In some embodiments, the active material powder may be divided into a first active material powder and a second active material powder having an average particle diameter smaller than that of the first active material powder. In this case, the first active material powder having a relatively large average particle diameter may only be fluidizable.

Accordingly, a recovery of the lithium precursor from the first active material powder may be performed through the reductive reaction, and a recovery of the lithium precursor from the second active material powder may be performed through an acid treatment process.

DETAILED DESCRIPTION

According to embodiments of the present invention, a method of regenerating a lithium precursor with high purity and high efficiency using an active material powder formed by removing dust particle from a cathode active material mixture in a classifier.

Hereinafter, embodiments of the present invention will be described in detail with reference to the accompanying drawings. However, the embodiments are provided as examples and the present invention is not limited to the specific embodiments described herein.

The term "precursor" in the present application is used to comprehensively refer to a compound including a specific metal to provide the specific metal included in a cathode active material.

Figure 1:
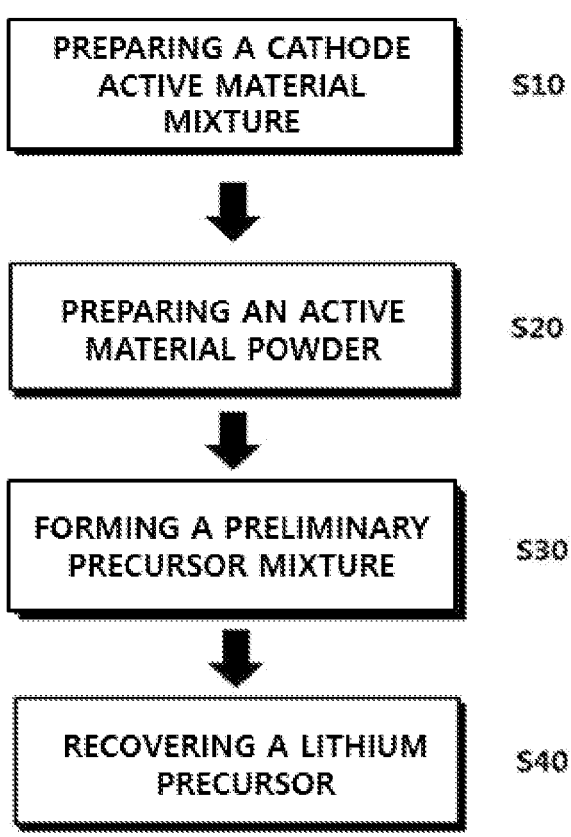
FIG. 1 is a schematic flow diagram for describing a method for regenerating a lithium precursor according to exemplary embodiments.

FIG. 1 is a schematic flow diagram for describing a method for regenerating a lithium precursor according to exemplary embodiments.

In exemplary embodiments, a cathode active material mixture which includes an active material powder including a lithium composite oxide, and dust particles may be prepared. The cathode active material mixture may include a lithium-containing compound obtained or regenerated from an electrical device or a chemical device. Non-limiting examples of the cathode active material mixture may include various lithium-containing compounds such as lithium oxide, lithium carbonate, lithium hydroxide, etc.

In exemplary embodiments, the cathode active material mixture may include an active material powder and dust particles obtained from a waste lithium secondary battery (e.g., in a step S10).

The waste lithium secondary battery may include an electrode assembly including a cathode, an anode and a separation layer interposed between the cathode and the anode. For example, the cathode and the anode may include a cathode active material layer and an anode active material layer coated on the cathode current collector and the anode current collector, respectively.

For example, a cathode active material included in the cathode active material layer may include a lithium composite oxide containing lithium and a transition metal.

In some embodiments, the cathode active material may include a lithium composite oxide represented by Chemical Formula 1 below.

$$Li_xM1_aM2_bM3_cO_y \qquad \text{[Chemical Formula 1]}$$

In Chemical Formula 1, M1, M2 and M3 may be a transition metal selected from Ni, Co, Mn, Na, Mg, Ca, Ti, V, Cr, Cu, Zn, Ge, Sr, Ag, Ba, Zr, Nb, Mo, Al, Ga or B. In Chemical Formula 1, $0 < x \le 1.1$, $2 \le y \le 2.2$, $0 < a < 1$, $0 < b < 1$, $0 < c < 1$, and $0 < a+b+c \le 1$.

In some embodiments, the cathode active material may include an NCM-based lithium composite oxide including nickel, cobalt and manganese. The NCM-based lithium composite oxide may be prepared by reacting a lithium precursor and an NCM precursor (e.g., an NCM oxide) with each other through a co-precipitation reaction.

However, embodiments of the present invention may be commonly applied to a cathode material including the NCM-based lithium composite oxide and a lithium-containing lithium composite oxide cathode material.

For example, a waste cathode may be recovered by separating the cathode from the waste lithium secondary battery. The cathode may include the cathode current collector (e.g., aluminum (Al)) and the cathode active material layer as described above, and the cathode active material layer may include a conductive material and a binder together with the above-described cathode active material.

In some exemplary embodiments, the cathode active material mixture may further include a carbon-based conductive material and a binder together with the lithium composite oxide.

The carbon-based conductive material may include, e.g., a carbon-based material such as graphite, carbon black, graphene, carbon nanotube, etc. The binder may include a resin material, e.g., vinylidenefluoride-hexafluoropropylene copolymer (PVDF-co-HFP), polyvinylidenefluoride (PVDF), polyacrylonitrile, polymethylmethacrylate, etc.

The cathode active material mixture may be prepared from the recovered cathode. In some embodiments, the cathode active material mixture may be obtained in the form of a powder by a physical treatment such as a pulverization treatment. As described above, the cathode active material mixture may include the active material powder including lithium composite oxide particles derived from the cathode active material. For example, the lithium composite oxide particles may include an NCM-based lithium oxide powder (e.g., $Li(NCM)O_2$).

In some embodiments, the recovered cathode may be heat-treated before the pulverization treatment. Accordingly, during the pulverization treatment, detachment of the cathode current collector may be facilitated, and the binder and the conductive material may be at least partially removed. A temperature of the heat treatment may be, e.g., from about 100 to 500° C., preferably from about 350 to 450° C.

In some embodiments, the cathode active material mixture may be obtained after immersing the recovered cathode in an organic solvent. For example, the recovered cathode may be immersed in the organic solvent to separate and remove the cathode current collector, and the cathode active material mixture may be selectively extracted through a centrifugation.

Through the above-described processes, the cathode active material mixture from which the contents of the cathode current collector component and the carbon-based component derived from the conductive material and/or the binder are substantially removed or reduced may be achieved.

For example, the cathode active material mixture may include dust particles. For example, the dust particles may include particles (e.g., carbon black) derived from the carbon-based conductive material and the binder. The dust particles may include a powder formed by pulverizing the carbon-based conductive material and the binder through the physical method.

In exemplary embodiments, dust particles 60 may be separated from the cathode active material mixture using a classifier 100 to collect an active material powder 70 including lithium composite oxide particles (for example, in a step S20).

Figure 2:
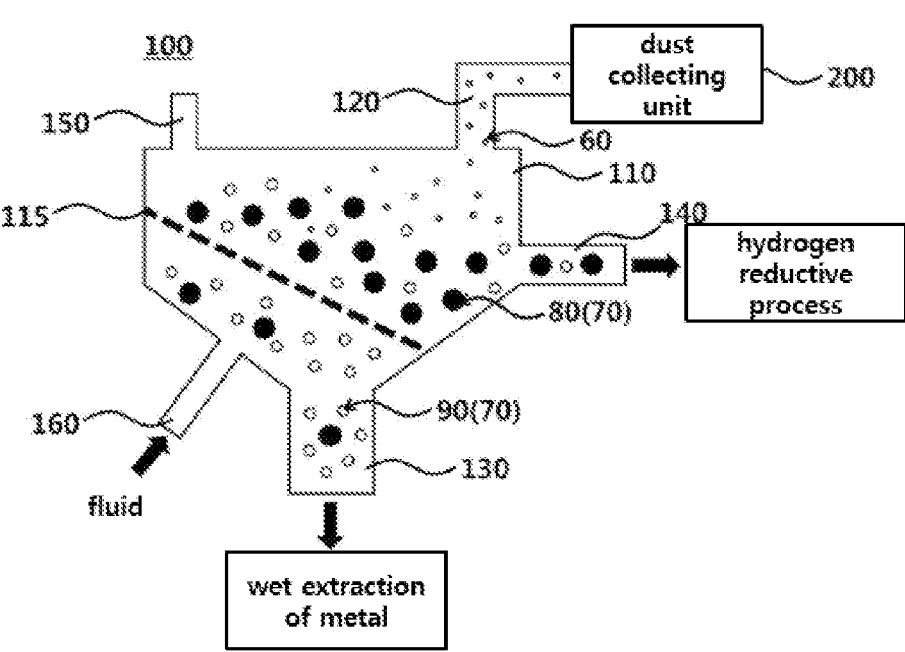
FIG. 2 is a schematic cross-sectional view illustrating a classifier according to exemplary embodiments.

FIG. 2 is a schematic cross-sectional view illustrating a classifier according to exemplary embodiments.

For example, the classifier 100 may include an active material inlet 150 into which the cathode active material mixture including the active material powder 70 that contains the lithium composite oxide particles and the dust particles 60 is injected, a classifying body 110 including a classifying sieve 115 that classifies the active material powder 70 into a first active material powder and a second active material powder, an upper outlet 120 which is positioned at an upper portion of the classifying body 110 and through which the dust particles 60 are scattered and discharged from the cathode active material mixture, an active material outlet 140 connected to a central portion of the classifying body 110 to discharge the first active material powder, and a lower discharge outlet 130 connected to a lower portion of the classifying body 110 to discharge the second active material powder.

In some exemplary embodiments, the classifier 100 may further include a fluid inlet 160 which is positioned at a lower portion of the classifying body 110 and into which a fluid is injected.

For example, the classifier 100 may remove the dust particles 60 from the cathode active material mixture by the fluid flowing into the classifying body 110. In this case, the active material powder 70 from which at least some of the dust particles 60 are removed may be collected from the cathode active material mixture.

In this case, the dust particles 60 may have a smaller density than that of the active material powder 70 to be scattered and removed from the cathode active material mixture by the fluid.

Accordingly, when the dust particles 60 included in the active material powder 70 include particles derived from the carbon-based conductive material and the binder, and the dust particles 60 included in the active material powder 70 are separated, particles derived from the carbon-based conductive material and the binder may be separated in the active material powder 70 so that side reactions that may occur in a hydrogen reductive process to be described later may be suppressed, thereby improving a recovery ratio of the lithium precursor.

For example, the fluid may be a liquid or a gas. For example, the fluid may be a non-reactive fluidizing gas. For example, the non-reactive fluidizing gas may include nitrogen ($N_2$), helium (He), neon (Ne), argon (Ar), krypton (Kr) or xenon (Xe).

The fluid may form a cyclone by a propeller, etc., located at an inside of the classifying body 110. In this case, the dust particles 60 may be removed from the cathode active material mixture by the cyclone.

In some exemplary embodiments, the dust particles 60 may be scattered to the upper portion of the classifying body 110, and may be discharged through the upper outlet 120 located at the upper portion of the classifying body 110. The dust particles 60 discharged through the upper outlet 120 may be transferred to a dust collecting unit 200 to be collected.

For example, the dust collecting unit 200 may form a negative pressure at an inside of the upper outlet 120 to suck the dust particles 60. For example, the dust particles 60 sucked into the upper outlet 120 may be collected by a static electricity formed in the dust collecting unit 200.

In some exemplary embodiments, the active material powder 70 formed by separating the dust particles 60 from the cathode active material mixture may include the lithium composite oxide particles derived from the cathode active material.

For example, the lithium composite oxide particles may include first lithium composite oxide particles 80 and second lithium composite oxide particles 90 having different average particle diameters. For example, the first lithium composite oxide particles 80 may have a larger average particle diameter (D50) than that of the second lithium composite oxide particles 90.

In this case, the first lithium composite oxide particles 80 may have an appropriate particle diameter value capable of being fluidized easily fluidized in a fluidized bed reactor, and the second lithium composite oxide particles 90 may have an average particle diameter (D50) smaller than that of the first lithium composite oxide particles 80, and may include fine particles that may be scattered instead of being fluidized within the fluidized bed reactor.

In this case, the average particle diameter (D50) of the first lithium composite oxide particles 80 may be in a range from about 10 μm to 100 μm, and a particle size distribution (PSD) may be in a range from about 10 to 300 μm. The average particle diameter (D50) of the second lithium composite oxide particles 90 may be in a range from about 1 to 5 μm, and a particle size distribution (PSD) may be in a range from 0.1 to 10 μm.

In some exemplary embodiments, the active material powder 70 may be classified into the first active material powder and the second active material powder which may be collected separately. In this case, the first active material powder and the second active material powder may be classified through the classifying sieve 115.

For example, the first active material powder may be defined as an active material powder easily fluidized in the fluidized bed reactor, and the second active material powder may be defined as an active material powder scattered at an inside of the fluidized bed reactor.

For example, the first active material powder may include the first lithium composite oxide particles 80, and the second active material powder may include the second lithium composite oxide particles 90.

For example, the first active material powder and the second active material powder may each include both the first lithium composite oxide particles 80 and the second lithium composite oxide particles 90, but the first active material powder may include a high proportion of the first lithium composite particles 80 to be easily fluidized in the fluidized bed reactor, and the second active material powder may have a high proportion of the second lithium composite oxide particles 90 to be scattered at the inside the fluidized bed reactor.

For example, the classifying sieve 115 may be a porous plate having fine holes through which particles satisfying a predetermined particle size range may only be passed. In this case, the active material powder 70 may be classified into the first active material powder and the second active material powder by the classifying sieve 115. For example, the classifying sieve 115 may be three-dimensionally vibrated by eccentric rotation of a rotary weight located at a lower portion of the classifying sieve 115, and the active material powder 70 may be classified into the first active material powder and the second active material powder by the three-dimensional vibration of the classifying sieve 115.

For example, the three-dimensional vibration may include a circular vibration, an elliptic vibration and a linear vibration caused by the eccentric rotation of the rotating weight.

For example, a separation efficiency for each particle size of the classifying sieve 115 may be from 60 to 90%. For example, the classifying sieve 115 may include a hole. For example, the hole may be a quadrangle shape (e.g., a square).

For example, a size of the hole may be from about 5 to 60 μm. Preferably, the size of the hole may be from about 15 to 50 μm, more preferably from about 25 to 40 μm.

In some exemplary embodiments, the classifying sieve 115 may have a multi-stage structure in which a plurality of sieves are stacked. For example, the multi-stage structure may include five or more sieves. Preferably, the multi-stage structure may include 10 or more sieves, more preferably 20 or more sieves.

For example, when the classifying sieve 115 includes the multi-stage structure, separation efficiency between the first active material powder and the second active material powder may be further improved.

In some exemplary embodiments, an average particle diameter (D50) of the second active material powder may be smaller than an average particle diameter (D50) of the first active material powder.

For example, an active material powder failing to pass through the classifying sieve 115 may be defined as the first active material powder, and the active material powder passing through the classifying sieve 115 may be defined as the second active material powder. In this case, most of the second lithium composite oxide particles 90 may pass through the classifying sieve 115 included in the classifying body 110. However, only a portion of the first lithium composite oxide particles 80 may pass through the classifying sieve 115 and most of the first lithium composite oxide particles 80 may fail to pass through the classifying sieve 115.

In some exemplary embodiments, a ratio of the size of the hole relative to the average particle diameter (D50) of the second active material powder may be in a range from about 1.5 to 5. Preferably, the ratio of the size of the hole relative to the average particle diameter (D50) of the second active material powder may be in a range from 2.5 to 4.

For example, when the ratio of the hole size relative to the average particle diameter (D50) of the second active material powder satisfies the above range, the second active material powder may be separated from the first active material powder with higher efficiency. For example, in the above range, a separation ratio of the second active material powder may be 90% or more.

Accordingly, the first active material powder may have a higher ratio of the first lithium composite oxide particles 80 than that in the second active material powder, and the second active material powder may have a higher ratio of the second lithium composite oxide particles 90 than that in the first active material powder.

For example, the first active material powder may have a high proportion of the first lithium composite oxide particles 80 capable of being easily fluidized, so that efficiency of an reductive process and efficiency of recovering the lithium precursor, which will be described later, may be further improved. For example, the second active material powder may have a high proportion of the second lithium composite oxide particles 90 that may not be easily fluidized, and thus may not be suitable for the reductive process to be described later. In this case, the lithium precursor may be recovered by an acid-treating the second active material powder.

In some exemplary embodiments, a ratio of an average particle diameter of the first lithium composite oxide particles 80 relative to an average particle diameter of the second lithium composite oxide particles 90 may be in a range from about 2 to 100. In the particle size ratio range, the content of the first lithium composite oxide particles 80 included in the first active material powder may be maximized, and the content of the first lithium composite oxide particles 80 included in the second active material powder may be minimized. Accordingly, recovery efficiency of the lithium precursor may be further improved.

For example, a ratio of the first lithium composite oxide particles 80 among lithium composite oxide particles included in the first active material powder may be 95% or more. For example, a ratio of the second lithium composite oxide particles 90 among lithium composite oxide particles included in the second active material powder may be 50% or more. In the above range, enhanced recovery efficiency of the lithium precursor may be more easily achieved.

In some exemplary embodiments, the first active material powder may be discharged through the active material outlet 140 connected to the central portion of the classifying body 110, and the second active material powder may be discharged through the lower discharge outlet 130 connected to the lower portion of the classifying body 110.

In some exemplary embodiments, the separated second active material powder may be treated with an acid solution. In this case, the lithium precursor may be recovered from the second active material powder through the acid solution treatment. Accordingly, the recovery efficiency of the lithium precursor may be further improved.

Particularly, when the second active material powder is added as a raw material for the reductive process to be described later, the recovery efficiency of the lithium precursor may be degraded due to impurities and scattering of the second active material powder. However, the second active material powder may be used as a raw material of a wet metal extraction process (e.g., the acid solution treatment) so that the recovery efficiency of the lithium precursor may be further improved.

For example, the acid solution treatment may be a leaching process using an acidic extractant. For example, in the acid solution treatment, the lithium precursor may be extracted by mixing the second active material powder with the acidic extractant diluted with a diluent, and then adjusting an equilibrium pH. The second active material powder from which the lithium precursor is extracted may be mixed with sulfuric acid as a removing agent to extract the transition metal.

For example, the acidic extractant may include at least one selected from the group consisting of di-2-ethylhexylphosphoric acid, 2-ethylhexyl phosphonic acid mono-2-ethylhexyl ester, a mixture of di-2-ethylhexylphosphoric acid and tri-butyl-phosphate, and a mixture of 2-ethylhexyl phosphonic acid mono-2-ethylhexyl ester and tri-butyl-phosphate.

For example, the diluent may include a non-aromatic hydrocarbon.

For example, the equilibrium pH may be in a range from about 5.5 to 6.5. In the equilibrium pH range, a lithium extraction ratio may be effectively increased.

In some exemplary embodiments, the separation of the dust particles 60 and the classification of the first active material powder and the second active material powder may be performed together in the classifier 100. Accordingly, the lithium precursor recovery process may be simplified, and process efficiency may be further improved.

In exemplary embodiments, a preliminary precursor mixture may be prepared from the active material powder 70 (e.g., in a step S30). In exemplary embodiments, the first active material powder may be subjected to a hydrogen reductive treatment to form the preliminary precursor mixture.

In some embodiments, the hydrogen reductive treatment may be performed using a fluidized bed reactor. For example, the active material powder may be introduced into the fluidized bed reactor and a hydrogen gas may be injected from a lower portion of the fluidized bed reactor.

For example, if the first active material powder is used, a proportion of the first lithium composite oxide particles 80 may be increased so that a fluidization may be more easily implemented. Accordingly, efficiency of the hydrogen reductive process and the recovery efficiency of the lithium precursor may be further improved.

A cyclone may be formed from the lower portion of the fluidized bed reactor by the hydrogen gas, and the preliminary precursor mixture may be generated while contacting the active material powder 70. In this case, the active material powder 70 may not contain the dust particles 60 or may contain a trace amount of the dust particles 60, so that undesired side reactions other than the hydrogen reduction may be prevented. Accordingly, yield of the lithium precursor may be further improved.

In some embodiments, a carrier gas may be mixed and injected together with the hydrogen gas from a bottom of the fluidized bed reactor. Accordingly, a gas-solid mixing may be promoted in a fluidized bed to promote a reaction, and a reaction layer of the preliminary precursor mixture in the fluidized bed reactor may be easily formed. The carrier gas may include, e.g., an inert gas such as nitrogen ($N_2$) or argon (Ar).

The preliminary precursor mixture may include a product of the hydrogen reduction of the lithium-transition metal oxide included in the active material powder 70. If the NCM-based lithium oxide is used as the lithium-transition metal oxide, the preliminary precursor mixture may include a preliminary lithium precursor and a transition metal-containing product.

The preliminary lithium precursor may include lithium hydroxide, lithium oxide and/or lithium carbonate. In exemplary embodiments, the preliminary lithium precursor may be obtained through the hydrogen reductive reaction, so that a mixed content of lithium carbonate may be lowered.

The transition metal-containing product may include Ni, Co, NiO, CoO, MnO, etc.

The hydrogen reductive reaction may be performed at a temperature from about 400 to 700° C., preferably from 450 to 550° C.

In exemplary embodiments, after collecting the preliminary precursor mixture, a washing treatment with water may be performed (e.g., in a step S40).

The preliminary lithium precursor may be converted into a lithium precursor substantially consisting of lithium hydroxide by the washing treatment. For example, lithium oxide and lithium carbonate mixed in the preliminary lithium precursor may be converted into lithium hydroxide by reacting with water, or may be washed and removed. Accordingly, a high-purity lithium precursor converted into a desired lithium hydroxide form may be produced.

The preliminary lithium precursor may react with water to be dissolved therein so that an aqueous lithium hydroxide solution may be substantially prepared.

The transition metal-containing product included in the preliminary precursor mixture may be precipitated without being dissolved or reacted in water by the washing treatment. Accordingly, the transition metal-containing product may be separated by a filtration and the lithium precursor including high-purity lithium hydroxide may be obtained.

In some embodiments, the water washing treatment may be performed under a condition in which carbon dioxide ($CO_2$) is excluded. For example, the washing treatment may be performed in a $CO_2$-free atmosphere (e.g., an air atmosphere from which $CO_2$ is removed), so that regeneration of lithium carbonate may be prevented.

In an embodiment, water provided during the washing treatment may be purged (e.g., nitrogen purged) using a $CO_2$-deficient gas to create a $CO_2$-free atmosphere.

In some embodiments, the precipitated and separated transition metal-containing product may be treated with an acid solution to form precursors in the form of an acid salt of each transition metal. In an embodiment, sulfuric acid may be used as the acid solution.

In this case, $NiSO_4$, $MnSO_4$ and $CoSO_4$ may be recovered as the transition metal precursor.

As described above, the lithium precursor substantially consisting of lithium hydroxide may be obtained by subjecting the preliminary precursor mixture produced by the hydrogen reduction to the washing with water. Thus, a cathode active material having a higher capacity and an enhanced life-span may be obtained while preventing by-products of other types of the lithium precursor such as lithium carbonate.

The lithium precursor may include lithium hydroxide (LiOH), lithium oxide ($Li_2O$) or lithium carbonate ($Li_2CO_3$). Lithium hydroxide may be advantageous as the lithium precursor from aspect of charge/discharge properties, life-span properties, high temperature stability, etc., of a lithium secondary battery. For example, lithium carbonate may cause a deposition reaction on the separation layer, thereby degrading life-span stability.

Accordingly, according to embodiments of the present invention, a method of regenerating lithium hydroxide as the lithium precursor with a high selectivity may be provided.

What is claimed is:

1. A method for regenerating a lithium precursor, the method comprising:

preparing a cathode active material mixture that comprises an active material powder including lithium composite oxide particles and dust particles;

collecting the active material powder by separating the dust particles from the cathode active material mixture using a classifier;

reducing the active material powder to form a preliminary precursor mixture; and recovering a lithium precursor from the preliminary precursor mixture, wherein the collecting comprises classifying the active material powder into a first active material powder and a second active material powder and collecting each of the first active material powder and the second active material powder, wherein the collected first active material powder is subjected to a reductive treatment to form the preliminary precursor mixture, and wherein the separation of the dust particles and the classification of the first active material powder and the second active material powder are performed together in the classifier, wherein the collected second active material powder is treated with an acid solution.

2. The method for regenerating a lithium precursor of claim 1, wherein the dust particles comprise particles derived from a carbon-based conductive material and a binder.

3. The method for regenerating a lithium precursor of claim 1, wherein an average particle diameter of the second active material powder is smaller than an average particle diameter of the first active material powder.

4. The method for regenerating a lithium precursor of claim 1, wherein the reducing the first active material powder is performed in a fluidized bed reactor using a reductive reaction gas.

5. The method for regenerating a lithium precursor of claim 1, wherein recovering the lithium precursor from the preliminary precursor mixture comprises washing the preliminary precursor mixture with water.

6. The method of claim 1, wherein the classifier comprises:

an active material inlet through which a cathode active material mixture that comprises an active material powder including lithium composite oxide particles and dust particles is injected;

a classifying body comprising a classifying sieve for classifying the active material powder into a first active material powder and a second active material powder;

an upper outlet located at an upper portion of the classifying body so that the dust particles are scattered and discharged from the cathode active material mixture;

an active material outlet connected to a central portion of the classifying body to discharge the first active material powder; and a lower outlet connected to a lower portion of the classifying body to discharge the second active material powder of the cathode active material mixture.

7. The method of claim 6, wherein the classifier further comprises: a fluid inlet located at the lower portion of the classifying body so that a fluid is injected therethrough.

* * * * *